Patented Dec. 30, 1930

1,787,048

UNITED STATES PATENT OFFICE

ROBERT BURNS MACMULLIN AND MAURICE C. TAYLOR, OF NIAGARA FALLS, NEW YORK, ASSIGNORS TO THE MATHIESON ALKALI WORKS, INC., OF NEW YORK, N. Y., A CORPORATION OF VIRGINIA

HYPOCHLORITE COMPOSITION

No Drawing. Application filed August 16, 1928. Serial No. 300,148.

This invention relates to improvements in the production of calcium hypochlorite compositions. The invention includes an improved process for producing a new intermediate calcium hypochlorite product and an improved process for producing as a final product a stable calcium hypochlorite. The invention also includes the new intermediate product of the process.

We have found that under regulated conditions in a system containing Na, Ca, OCl, and Cl ions there can be obtained an entirely new triple salt which, so far as we are aware, has not heretofore been known. It is a triple salt having a composition corresponding to the formula

$Ca(OCl)_2 . NaOCl . NaCl . 12H_2O$.

It is easily identified not only by analysis but also by its crystalline form and optical properties. The crystals belong to the hexagonal system and appear as right hexagonal prisms with each edge bevelled. The crystals are anisotropic when viewed from the side and isotropic when viewed from the end.

We have studied the aqueous equilibrium in the system including the four ions Na, Ca, OCl and Cl and have found that the new triple salt can be produced by different methods of procedure.

For example, if sodium chloride is added to a saturated solution of calcium hypochlorite at temperatures of about 16° C. or lower and the solution seeded with crystals of the triple salt, a large yield of the crystals of this triple salt is obtained.

The new triple salt can also be obtained by chlorinating a mixture of caustic soda, calcium hydroxide and water in suitable proportions such as 40:37:180 at a temperature below 16° C., giving a large yield of the new crystals.

The proportions in the examples just given can be somewhat varied, it being important to have the four ions together in sufficient concentration and at a sufficiently low temperature so that the new triple salt will be obtained in a stable form.

The new triple salt is comparatively stable up to a temperature of about 22° C., at or about which temperature it undergoes a transformation into its constituent salts or hydrated salts. The transformation is apparent to the eye or the touch as the crystals then lose their shape and become pasty. When cooled again the new triple salt forms but slowly. While we have described the salt as comparatively stable at temperatures below 22° C., it nevertheless appears to undergo a slow decomposition with evolution of oxygen and some chlorine, much as does sodium hypochlorite under similar conditions. The crystals of the new salt can, however, be dried at a low temperature without great decomposition and if kept below 22° C. with preservation of the general outlines of the crystals during the drying process, giving a product which is somewhat granular in form and lighter in density than the dehydrated crystals.

The new triple compound or salt can itself be employed for example for bleaching purposes, as where it is to be used at the place it is produced or before it has had an opportunity of undergoing decomposition. In order to protect it against decomposition it should be maintained at a low temperature.

The new triple salt forms a valuable intermediate product for use in the preparation of a stable calcium hypochlorite final product. We have found that the sodium hypochlorite content of this new triple salt can be converted into calcium hypochlorite to form a final calcium hypochlorite product admixed with sodium chloride. The tendency of the new triple compound to decompose appears to be due to the sodium hypochlorite which it contains in its crystalline structure. Sodium hypochlorite either hydrated or anhydrous is known to be chemically unstable under similar conditions. We have found, however, that the sodium hypochlorite can be eliminated from these crystals without appreciable loss of active chlorine by replacing the sodium of the sodium hypochlorite with calcium to give a final product containing approximately twice as much calcium hypochlorite as sodium chloride. In the final calcium hypochlorite product the active chlorine is in a stable form and the product is a valuable product in other respects as will be hereinafter described.

We have found that the new triple compound above described can be converted into a final stable calcium hypochlorite product by treating it with a chlorinated lime solution or slurry containing an amount of calcium chloride chemically equivalent to the sodium hypochlorite in the crystals. The chlorinated lime solution or slurry can be obtained by the chlorination of milk of lime.

This process of converting the new triple compound into a final stable calcium hypochlorite product constitutes one of the novel features of the invention. This process is a sub-process step of the complete process which includes the process of producing the new triple compound, which also forms a novel process of the invention. The complete process accordingly partakes of the nature of a two-step process in which the new intermediate compound is first produced and then converted into the final stable calcium hypochlorite product.

The invention will be further illustrated by the following more detailed examples, but it will be understood that the invention is not limited thereto.

According to one example of the invention a mixture of caustic soda (NaOH), calcium hydroxide (Ca(OH)$_2$), and water (H$_2$O) in the proportion of 40 : 37 : 180 parts is chlorinated at a temperature below 16° C. and preferably at a temperature around 10° C. As a result of this chlorination the new triple compound Ca(OCl)$_2$.NaOCl.NaCl.12H$_2$O. is produced in a solid form which contains active chlorine equivalent to 64 to 76% of the chlorine originally used. The new compound is in the form of hexagonal crystals, the solubility of which is less at lower temperatures so that a better yield is obtained if the reaction product is cooled to a temperature around 0° C. or lower before separating. The crystals can be separated from the mother liquor by centrifuging or filter pressing.

Independently of the above process of producing the new triple salt, milk of lime is chlorinated to produce a slurry of calcium hypochlorite (Ca(OCl)$_2$) crystals in a mother liquor containing calcium chloride. For example, 74 parts by weight of calcium hydroxide (Ca(OH)$_2$) and 213 parts of water are chlorinated with 71 parts of chlorine at a temperature of about 25° C. and the final mixture which is practically free from lime is then cooled to about 10° C. or below and is used in the next step of the process.

The chlorinated lime slurry produced as above described is mechanically mixed with the crystalline triple salt produced as above described in such proportion that the sodium hypochlorite in the crystals is chemically equivalent to the calcium chloride in the slurry according to the following equation:

$$2NaOCl + CaCl_2 = 2NaCl + Ca(OCl)_2$$

The temperature during the mechanical admixture should be kept at around 10° C. or lower to prevent transformation of the triple compound during mixing. There is a slight absorption of heat during mixture causing a lowering of a few degrees in temperature which tends to offset external heating.

When warmed to about 16° C. the crystals in the mixture produced as above described transform, liberate sodium hypochlorite, which then reacts with the calcium chloride of the slurry according to the equation just noted. Accordingly, after the mixture has been brought about at a lower temperature the mixture is warmed up to bring about the desired reaction. A mass of interlocking crystals of calcium hypochlorite $$(Ca(OCl)_2.2H_2O)$$

then forms and the mixture sets to a rather rigid mass.

The material produced as above described may be dried in vacuum. A product containing 65 to 70% Ca(OCl)$_2$ can be obtained, the rest being chiefly sodium chloride. The product thus obtained is a stable product which can be stored and shipped and is a more valuable product than bleaching powder.

We claim:—

1. The method of producing a new hypochlorite compound which comprises bringing together in the presence of water sodium, calcium, chloride and OCl ions at a temperature below about 16° C. to form a triple salt of calcium hypochlorite, sodium hypochlorite and sodium chloride in hydrated crystalline form.

2. The method of producing a new hypochlorite compound which comprises chlorinating mixed sodium and calcium hydroxides in the presence of a limited and regulated amount of water and at a temperature below about 16° C. to form a triple salt of calcium hypochlorite, sodium hypochlorite and sodium chloride in hydrated crystalline form.

3. The method of producing a solid calcium hypochlorite product containing sodium chloride which comprises subjecting a triple salt of calcium hypochlorite, sodium hypochlorite and sodium chloride to the action of calcium chloride in the presence of a limited amount of water and at a temperature below about 16° C.

4. The method of producing a solid calcium hypochlorite product containing sodium chloride which comprises adding a strong solution of calcium chloride to a crystalline triple salt of calcium hypochlorite, sodium hypochlorite and sodium chloride at a temperature below about 16° C., the calcium chloride being used in proportions to react with the sodium hypochlorite of the triple salt to form calcium hypochlorite and sodium chloride.

5. The method of producing a solid calcium hypochlorite product containing sodium chloride which comprises admixing a chlorinated lime slurry containing calcium hypochlorite and containing calcium chloride in solution, with a triple salt of calcium hypochlorite, sodium hypochlorite and sodium chloride at a temperature below about 16° C., and causing the calcium chloride to react with the sodium hypochlorite of the triple salt to form calcium hypochlorite.

6. The method of producing a solid calcium hypochlorite product containing sodium chloride which comprises chlorinating milk of lime to form a slurry of solid calcium hypochlorite crystals in a mother liquor containing calcium chloride, admixing such slurry with a crystalline triple salt of calcium hypochlorite, sodium hypochlorite and sodium chloride at a temperature below the transformation temperature of such crystalline salt and subsequently heating the resulting mixture to a temperature above the transformation temperature of such salt to cause reaction of the calcium chloride with the sodium hypochlorite and to produce a solid calcium hypochlorite product containing sodium chloride.

7. The method of producing calcium hypochlorite which comprises causing to react in the presence of a limited and regulated amount of water, sodium, calcium, chlorine and OCl ions at a temperature below about 16° C. to form a crystalline triple salt of calcium hypochlorite, sodium hypochlorite and sodium chloride, separating the crystalline salt from the mother liquor, and causing the triple salt to react with calcium chloride in solution to form calcium hypochlorite from the sodium hypochlorite.

8. The method of producing calcium hypochlorite which comprises causing to react in the presence of a limited and regulated amount of water, sodium, calcium, chlorine and OCl ions at a temperature below 16° C. to form a crystalline triple salt of calcium hypochlorite, sodium hypochlorite and sodium chloride, separating the crystalline salt from the mother liquor, and causing the triple salt to react with a chlorinated lime slurry containing calcium chloride to form a calcium hypochlorite product substantially free from sodium hypochlorite.

9. The method of producing a calcium hypochlorite product which comprises admixing a triple salt of calcium hypochlorite, sodium hypochlorite and sodium chloride in crystalline form with a chlorinated lime slurry containing calcium hypochlorite crystals in a mother liquor containing calcium chloride, such admixture being effected at a temperature below about 10° C. to prevent transformation of the triple salt during mixing, warming the mixture somewhat to cause transformation of the triple salt and reaction of the sodium hypochlorite with the calcium chloride to form a mass of interlocking crystals of calcium hypochlorite and drying the resulting calcium hypochlorite product.

10. As a new product, a crystalline triple salt of calcium hypochlorite, sodium hypochlorite and sodium chloride.

11. As a new product, a crystalline triple salt of calcium hypochlorite, sodium hypochlorite and sodium chloride, having the formula $Ca(OCl)_2.NaOCl.NaCl.12H_2O$.

12. As a new product, a triple compound or salt of calcium hypochlorite, sodium hypochlorite and sodium chloride, in the form of a dried substantially water-free product.

In testimony whereof we affix our signatures.

ROBERT BURNS MacMULLIN.
MAURICE CRAIG TAYLOR.

CERTIFICATE OF CORRECTION.

Patent No. 1,787,048.  Granted December 30, 1930, to

ROBERT BURNS MacMULLIN ET AL.

It is hereby certified that error appears in the printed specification of the above numbered patent requiring correction as follows: Page 1, lines 69 and 70, for the word "dehydrated" read hydrated; and that the said Letters Patent should be read with this correction therein that the same may conform to the record of the case in the Patent Office.

Signed and sealed this 27th day of January, A. D. 1931.

(Seal)

M. J. Moore,
Acting Commissioner of Patents.